US012775757B2

(12) United States Patent
Kim et al.

(10) Patent No.: US 12,775,757 B2
(45) **Date of Patent: *Oct. 27, 2026**

(54) SYSTEM AND METHOD FOR MODELING A SEMICONDUCTOR FABRICATION PROCESS

(71) Applicant: Samsung Electronics Co., Ltd., Suwon-si (KR)

(72) Inventors: Hyunjoong Kim, Seoul (KR); Jaepil Shin, Suwon-si (KR); Moonhyun Cha, Yongin-si (KR); Changwook Jeong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 291 days.

This patent is subject to a terminal disclaimer.

(21) Appl. No.: 18/509,654

(22) Filed: Nov. 15, 2023

(65) Prior Publication Data

US 2024/0086599 A1 Mar. 14, 2024

Related U.S. Application Data

(63) Continuation of application No. 17/231,428, filed on Apr. 15, 2021, now Pat. No. 11,853,660.

(30) Foreign Application Priority Data

Sep. 23, 2020 (KR) ........................ 10-2020-0123319

(51) Int. Cl.
*G06F 30/39* (2020.01)
*G06F 30/27* (2020.01)
(Continued)

(52) U.S. Cl.
CPC ............. *G06F 30/27* (2020.01); *G06N 3/045* (2023.01); *G06N 3/08* (2013.01); *G06F 2119/02* (2020.01); *G06F 2119/18* (2020.01)

(58) Field of Classification Search
CPC .. G06F 30/27; G06F 2119/02; G06F 2119/18; G06F 30/39; G06N 3/045;
(Continued)

(56) References Cited

U.S. PATENT DOCUMENTS 7,473,495 B2 1/2009 Tanaka et al.
8,255,838 B2 8/2012 Xue et al.
(Continued)

FOREIGN PATENT DOCUMENTS

KR 100629292 B1 9/2006
KR 100809705 B1 3/2008
(Continued)

OTHER PUBLICATIONS

Ye et al., LithoGAN: End-to-End Lithography Modeling with Generative Adversarial Networks. Proceedings of the 56th Annual Design Automation Conference Jun. 2, 2019. 6 pages.
(Continued)

*Primary Examiner* — Nghia M Doan
(74) *Attorney, Agent, or Firm* — Wolf, Greenfield & Sacks, P.C.

(57) ABSTRACT

A system for modeling a semiconductor fabrication process includes at least one first processor and at least one second processor. The at least one first processor is configured to provide at least one machine learning (ML) model, which is trained by using a plurality of pairs of images of a design pattern sample and a physical pattern sample. The physical pattern sample is formed from the design pattern sample by using the semiconductor fabrication process. The at least one second processor is configured to provide an input image representing a shape of a design pattern and/or a physical pattern to the at least one first processor and to generate
(Continued)

output data defining the physical pattern and/or the design pattern based on an output image received from the at least one first processor.

20 Claims, 10 Drawing Sheets

(51) Int. Cl.

| | |
|---|---|
| ***G06N 3/045*** | (2023.01) |
| ***G06N 3/0475*** | (2023.01) |
| ***G06N 3/08*** | (2023.01) |
| ***G06N 3/088*** | (2023.01) |
| ***G06N 3/09*** | (2023.01) |
| ***G06N 3/094*** | (2023.01) |
| *G06F 119/02* | (2020.01) |
| *G06F 119/18* | (2020.01) |

(58) Field of Classification Search
CPC ........ G06N 3/08; G06N 3/0464; G06N 3/047; G06N 3/0475; G06N 3/09; G06N 3/094; G06N 3/063; G06N 3/084; G06N 20/00; G06N 3/088; G06V 10/422
See application file for complete search history.

(56) References Cited

U.S. PATENT DOCUMENTS

| | | | |
|---|---|---|---|
| 8,510,684 | B2 | 8/2013 | Jeong et al. |
| 9,785,046 | B2 | 10/2017 | Hsieh et al. |
| 10,275,473 | B2 | 4/2019 | Kim et al. |
| 10,495,967 | B2 | 12/2019 | Huang et al. |
| 10,539,881 | B1 * | 1/2020 | Sha ..................... G03F 7/70433 |
| 10,546,085 | B2 | 1/2020 | Hu et al. |
| 10,606,975 | B2 * | 3/2020 | Sha ........................ G06F 30/394 |
| 10,706,200 | B2 | 7/2020 | Sha et al. |
| 10,937,146 | B2 * | 3/2021 | Shinoda .................. G06T 7/001 |
| 11,455,443 | B1 | 9/2022 | Schubert et al. |
| 2008/0076047 | A1 | 3/2008 | Chun et al. |
| 2008/0077907 | A1 | 3/2008 | Kulkami |
| 2011/0202892 | A1 | 8/2011 | Lee et al. |
| 2017/0148226 | A1 | 5/2017 | Zhang et al. |
| 2018/0307947 | A1 * | 10/2018 | Choi .................... G06N 3/0475 |
| 2018/0314716 | A1 | 11/2018 | Kim et al. |
| 2019/0018325 | A1 | 1/2019 | Kim et al. |
| 2021/0027457 | A1 * | 1/2021 | Nakajima ............... G06F 30/27 |

FOREIGN PATENT DOCUMENTS

| | | | |
|---|---|---|---|
| KR | 20090069095 | A | 6/2009 |
| KR | 20100025822 | A | 3/2010 |

OTHER PUBLICATIONS

Ayng et al., GAN-OPC: Mask Optimization with Lithography-Guided Generative Adversarial Nets. IEEE Transactions on Computer-Aided Design of Integrated Circuits And Systems, Oct. 2020;39(10):2822-34.

* cited by examiner

SYSTEM AND METHOD FOR MODELING A SEMICONDUCTOR FABRICATION PROCESS

CROSS-REFERENCE TO RELATED APPLICATIONS

This application is a continuation of U.S. patent application Ser. No. 17/231,428, filed Apr. 15, 2021, which claims the benefit of Korean Patent Application No. 10-2020-0123319, filed Sep. 23, 2020, in the Korean Intellectual Property Office, the disclosures of which are incorporated herein in their entirety by reference.

BACKGROUND

Embodiments of the inventive concept relate to a semiconductor process, and more particularly, to a system and method for modeling a semiconductor fabrication process.

An integrated circuit (IC) may include patterns formed in a plurality of layers, and the patterns may be formed using various processes included in a semiconductor process. The size of the patterns may be reduced to increase the integration density of the IC, and the complexity of the semiconductor fabrication process may be increased to form patterns with a reduced size. A pattern (i.e., a physical pattern) formed in the semiconductor process may have a different shape from a designed pattern due to various factors.

SUMMARY

The inventive concept provides a system and method for modeling a semiconductor process for an integrated circuit (IC) including a pattern having a desired shape.

According to an aspect of the inventive concept, there is provided a system for modeling a semiconductor fabrication process. The system includes at least one first processor and at least one second processor. The at least one first processor is configured to provide at least one machine learning (ML) model, which is trained by using a plurality of pairs of images of a design pattern sample and a physical pattern sample. The physical pattern sample is formed from the design pattern sample by using the semiconductor fabrication process. The at least one second processor is configured to provide an input image representing a shape of a design pattern and/or a physical pattern to the at least one first processor and to generate output data defining the physical pattern and/or the design pattern based on an output image received from the at least one first processor.

According to another aspect of the inventive concept, there is provided a method including generating an input image representing a shape of a design pattern, providing the input image to an ML model, which is trained by using a plurality of pairs of images of a design pattern sample and a physical pattern sample. The physical pattern sample is formed from the design pattern sample using a semiconductor fabrication process. Output data defining a physical pattern corresponding to the design pattern is generated based on an output image provided from the ML model.

According to another aspect of the inventive concept, there is provided a method including generating an input image representing a shape of a physical pattern. The input image is provided to a first ML model, which is trained by using a plurality of pairs of images of a physical pattern sample and a design pattern sample. The design pattern sample is used to form the physical pattern sample by using a fabrication semiconductor process. Output data defining a design pattern is generated based on an output image provided from the first ML model.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
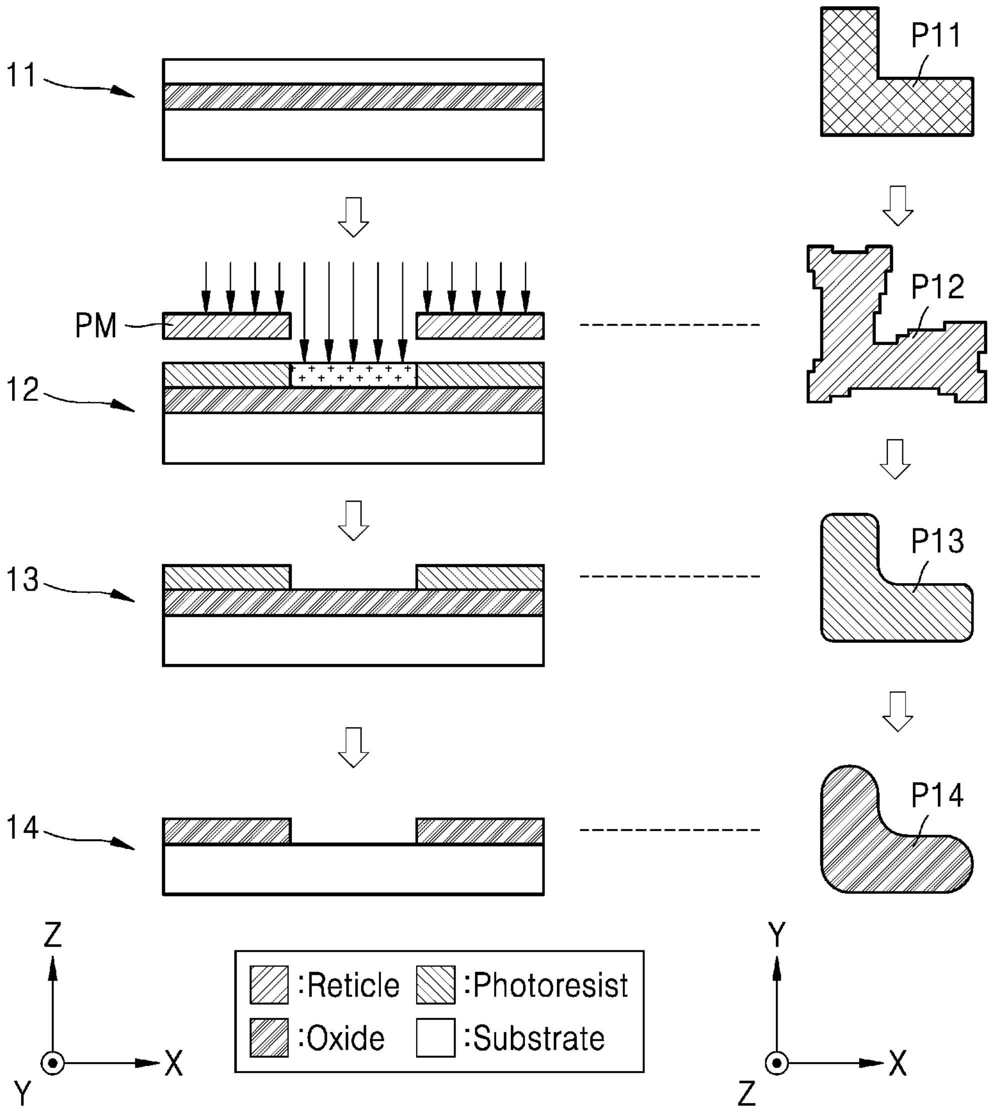
FIG. 1 is a diagram that illustrates operations for manufacturing an integrated circuit (IC) by using a semiconductor fabrication process according to an example embodiment of the inventive concept.

Hereinafter, example embodiments of the inventive concept will be described in detail with reference to the accompanying drawings. The same reference numerals are used for the same elements in the drawings, and redundant descriptions thereof will be omitted. As used herein, the term "and/or" includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination.

Embodiments of the inventive concept are described herein in the context of an artificial intelligence system comprising a machine learning system. It will be understood that other types of artificial intelligence systems can be used in other embodiments including, but not limited to, a multi-layer network, a deep learning system, and/or a computer vision system. Moreover, it will be understood that the multi-layer neural network described herein is a multi-layer artificial neural network comprising artificial neurons or nodes and does not include a biological neural network comprising real biological neurons.

FIG. 1 is a diagram that illustrates operations for manufacturing an integrated circuit (IC) by using a semiconductor fabrication process according to an example embodiment of the inventive concept. Specifically, a left side of FIG. 1 sequentially shows cross-sectional views of structures formed using a semiconductor fabrication process, and a right side of FIG. 1 sequentially shows plan views of the structures formed using the semiconductor fabrication process. As shown in FIG. 1, the IC may include patterns formed in a plurality of layers stacked in a Z-axial direction.

The semiconductor fabrication process may include various sub-processes for forming the patterns included in the IC. For example, the semiconductor fabrication process may include a photolithography process. The photolithography may refer to a process of forming a pattern by transferring a geometric pattern using light from a photomask to photosensitive chemical photoresist. Photoresist may include positive photoresist and negative photoresist. A portion irradiated with light may be dissolved by a developer in the positive photoresist, and a portion not irradiated with light may be dissolved by the developer in the negative photoresist. FIG. 1 illustrates an example of a photolithography process for forming a first pattern P11 having an "L" shape on an oxide layer by using the positive photoresist. As used herein, a pattern (e.g., the first pattern P11) having an optimum shape desired by a designer may be referred to as an ideal pattern. Although FIG. 1 illustrates an example in which a pattern is formed on an oxide layer, the pattern may be formed on another type of layer (e.g., an active layer or a metal layer) in a similar manner.

Referring to the left side of FIG. 1, a first structure 11 may include a substrate, an oxide layer, and a photoresist layer, which are sequentially stacked. For example, the oxide layer may be formed on a cleaned wafer, and positive photoresist may be applied to the oxide layer. In some embodiments, the positive photoresist may be applied to the oxide layer by using a spin coating process. In some embodiments, after the photoresist is applied, the wafer may be heated to remove an excess of solvent.

A photomask PM may be arranged on the first structure 11, and a second structure 12 may be formed by irradiating light to the arranged photomask PM. As shown in FIG. 1, the positive photoresist exposed to light in the photoresist layer may be chemically transformed. In some embodiments, the photomask PM may be referred to as a reticle and include a non-transmissive material (e.g., chromium (Cr)) formed on or under a glass layer that may transmit light. Light passing through an opening of the photomask PM may be diffracted, and an optical proximity correction (OPC) may be applied to compensate for errors caused by the diffraction of light. For example, as shown in the right side of FIG. 1, to form the first pattern P11, a second pattern P12 to which the OPC is applied may be formed in the photomask PM, and the second pattern P12 may have a different shape from the first pattern P11. The second pattern P12 may have a shape designed in consideration of the OPC. As used herein, the second pattern P12 may be referred to as a design pattern.

A developer may be applied to the second structure 12. Thus, a portion of the photoresist layer, which is irradiated with light, may be dissolved by the developer and removed from the second structure 12. Accordingly, as shown in FIG. 1, a third pattern P13 may be formed in the photoresist layer. A process of removing a portion of the photoresist layer, which is chemically transformed due to light, by using the developer may be referred to as a developing process. A structure (i.e., a third structure 13) in which the developing process is completed may be referred to as being in an after-develop inspection (ADI) state, and the third pattern P13 may be referred to as a pattern that is in the ADI state. In some embodiments, the developer may be provided by a spinner like photoresist.

An etching process may be performed on the third structure 13. Thus, a portion of the oxide layer, which is not protected by the photoresist, may be etched. The etching process may include a wet etching process (or a liquid etching process) and a dry etching process (or a plasma etching process) and may be used to remove a portion of an uppermost layer, which is not protected by the photoresist. After the etching process is completed, the photoresist may be removed. As a result, as shown in FIG. 1, a fourth pattern P14 may be formed in the oxide layer. A process of removing the photoresist may be referred to as a cleaning process. A structure (i.e., a fourth structure 14) in which the cleaning process is completed may be referred to as being in an after-clean inspection (ACI) state, and the fourth pattern P14 may be referred to as a pattern that is in an ACI state. In some embodiments, the wafer may be heated to remove the residual solvent. As described above, the third pattern P13 and the fourth pattern P14 may respectively correspond to patterns that are actually formed using sub-processes. As used herein, the third pattern P13 and the fourth pattern P14 may be referred to as physical patterns.

As shown in FIG. 1, a shape of a pattern may be changed due to the sub-processes, and the change in the shape of the pattern may be modeled as the transformation of the pattern. For example, the first pattern P11 corresponding to the ideal pattern to which the OPC is applied may be transformed into the second pattern P12, and the second pattern P12 may be transformed into the third pattern P13, which is in the ADI state, due to a light irradiating process and a developing process. In addition, due to the etching and cleaning processes, the third pattern P13 may be transformed into the fourth pattern P14 that is in the ACI state. As a result, the fourth pattern P14 may have a different shape from the ideal pattern (i.e., the first pattern P11), and it may be important to control the shape of the second pattern P12, such that the fourth pattern P14 has a shape most similar to the first pattern P11.

An operation of estimating the pattern (i.e., the third pattern P13) that is in the ADI state from the pattern (i.e., the second pattern P12) on the photomask PM by simulating errors caused by the diffraction of light passing through the photomask PM may be referred to as an optical rule check (ORC). The third pattern P13 (i.e., the pattern formed in the photoresist layer) may be estimated by using the ORC, but there may be a specific limit not only in the accuracy of simulation but also on estimating the fourth pattern P14 formed after the etching and cleaning processes by using the ORC process. Similarly, in the OPC, the second pattern P12 for forming the third pattern P13 that is in the ADI state may be estimated by simulating the errors caused by the diffraction of light, but there may be a specific limit not only in the accuracy of simulation but also on estimating the second pattern P12 by considering the fourth pattern P14, which is a final pattern.

As described below with reference to the drawings, a system and method for modeling a semiconductor process may estimate a pattern by using machine learning (ML) that is based on an image representing a shape of the pattern. The images representing shapes of a pattern may be featured to identify the individual independent variables that are used to train the ML model. The features extracted from the training images may be called attributes and the number of features may be called the dimension. Labels may be assigned to the patterns and the features thereof to ensure a consistent naming convention for both the input features and the generated outputs. The ML model may process both the featured training images, including the labels, and may be configured to test numerous functions to establish a quantitative relationship between the featured and labeled input images and the generated outputs. The ML model may use modeling techniques to evaluate the effects of various input data features on the generated outputs. These effects may then be used to tune and refine the quantitative relationship between the featured and labeled input data and the generated outputs. The tuned and refined quantitative relationship between the featured and labeled input data generated by the ML model is output for use on new data to generated predictive or estimates outputs. Thus, not only the pattern (e.g., the third pattern P13) that is in the ADI state, but also the pattern (e.g., the fourth pattern P14) that is in the ACI state may be estimated from the pattern (e.g., the second pattern P12) on the photomask PM. Also, not only the pattern (e.g., the third pattern P13) that is in the ADI state, but also the pattern (e.g., the second pattern P12), which is formed on the photomask PM and corresponds to the pattern (e.g., the fourth pattern P14) that is in the ACI state, may be estimated. Furthermore, the design pattern and/or the physical pattern may be precisely estimated even in double patterning technology (DPT) and triple patterning technology (TPT) in which simulations using ORC and OPC processes are limited. As described below with reference to FIGS. 4A and 4B, the estimated patterns may have high accuracy, and thus, the semiconductor fabrication process may be precisely modeled, and the time and cost required to construct or design a semiconductor process for manufacturing a designed IC may be significantly reduced. In addition, the semiconductor process may be simulated precisely by estimating the physical pattern corresponding to the design pattern, and the design pattern may be simulated precisely by estimating the design pattern corresponding to the physical pattern. Furthermore, an IC including a pattern (i.e., a designed pattern) having a desired shape may be manufactured using the semiconductor process, and thus, the productivity and reliability of the IC may be improved.

Figure 2:
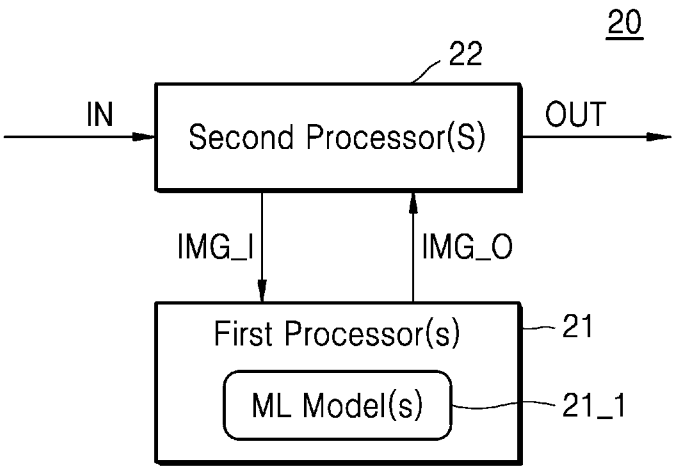
FIG. 2 is a block diagram of a system for modeling a semiconductor fabrication process according to an example embodiment of the inventive concept.

FIG. 2 is a block diagram of a system 200 for modeling a semiconductor fabrication process, according to an example embodiment of the inventive concept. As shown in FIG. 2, the system 20 may generate output data OUT defining a pattern from input data IN defining a pattern. As used herein, the pattern defined by the input data IN may be referred to as an input pattern, and the pattern defined by the output data OUT may be referred to as an output pattern. The input data IN and/or the output data OUT may have an arbitrary format (e.g., graphic design system ii (GDSII)) that geometrically defines a pattern. Hereinafter, FIG. 2 will be described with reference to FIG. 1.

The system 20 may refer to a special purpose computing system for modeling a semiconductor process using artificial intelligence technology including, for example, an ML model that is trained to estimate patterns used in semiconductor fabrication. For example, the system 20 may be a standalone computing system or a distributed computing system including systems capable of communicating with each other through a network. In addition, the system 20 may be a stationary system, such as a desktop computer or a server, or a portable system, such as a laptop computer. As shown in FIG. 2, the system 20 may include at least one first processor 21 and at least one second processor 22. In some embodiments, unlike that which is shown in FIG. 2, the system 20 may include a single processor configured to receive the input data IN, implement at least one ML model 21_1, and generate the output data OUT.

The at least one first processor 21 and/or the at least one second processor 22 may refer to an arbitrary processor configured to process data. For example, the at least one first processor 21 and/or the at least one second processor 22 may execute a program including a series of instructions or include logic hardware designed by logic synthesis. As used herein, the at least one first processor 21 and/or the at least one second processor 22 may be an arbitrary hardware-implemented data processing device including a circuit that is physically structured to execute predefined operations including operations expressed by instructions and/or code included in the program. For example, the data processing device may include a microprocessor, a central processing unit (CPU), a graphics processing unit (GPU), a neural processing unit (NPU), a processor core, a multi-core processor, a multi-processor, an application-specific IC (ASIC), an application-specific instruction-set processor (ASIP), and/or a field programmable gate array (FPGA).

Referring to FIG. 2, the at least one first processor 21 may implement at least one ML model 21_1. The at least one ML model 21_1 may include an ML model, which is trained by using a plurality of pairs of images of a design pattern and a physical pattern. Here, the physical pattern may be derived from a design pattern. That is, the physical pattern may be formed from the design pattern using a semiconductor fabrication process. As used herein, pairs of the design pattern and the physical pattern used to train the at least one ML model 21_1 may be referred to as pairs of the design pattern sample and a physical pattern sample. In some embodiments, an image of the design pattern sample may be generated from data used to form a pattern (e.g., P11) on a photomask PM. An image of the physical pattern sample may be generated by capturing an image of an IC (or a wafer) by using, for example, a scanning electron microscope (SEM). As shown in FIG. 2, the at least one first processor 21 may receive an input image IMG_I representing a shape of the input pattern from the at least one second processor 22 and provide an output image IMG_O of the at least one ML model 21_1 corresponding to the input image IMG_I to the at least one second processor 22.

The at least one ML model 21_1 may have a special purpose structure that is amenable to training using pairs of images. For example, the at least one ML model 21_1 may include an artificial neural network, a decision tree, a support vector machine, a Bayesian network, and/or a genetic algorithm. Hereinafter, the at least one ML model 21_1 will mainly be described with reference to the artificial neural network, but example embodiments are not limited thereto. Non-limiting examples of the artificial neural network may include a convolution neural network (CNN), a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, and a classification network. In some embodiments, the at least one the first processor 21 may include hardware designed to implement the at least one ML model 21_1, for example, an NPU or a GPU.

The at least one second processor 22 may generate an input image IMG_I representing a shape of a first pattern from the input data IN defining the input pattern. For example, the input image IMG_I may have a format that the at least one ML model 21_1 may identify, and the at least one second processor 22 may convert the input data IN and generate the input image IMG_I. In some embodiments, the input image IMG_I may be a binary image including pixels representing the presence or absence of pattern portions by single bits, respectively. Binary images may include pixels that may each assume one of two states corresponding to two colors, typically black and white. In addition, the input data IN may define a plurality of input patterns, and the at least one second processor 22 may select at least one input pattern, from among the plurality of input patterns, and generate an input image IMG_I representing a shape of the at least one selected input pattern. In some embodiments, as described below with reference to FIG. 8A, the at least one second processor 22 may generate a preprocessed input image IMG_I to obtain an output image IMG_O of a good quality.

The at least one second processor 22 may generate output data OUT defining an output pattern from an output image IMG_O representing a shape of the output pattern. For example, the at least one second processor 22 may convert an output image IMG_O having a format (e.g., a binary image), which may be identified by the at least one ML model 21_1 and generate the output data OUT. In addition, the at least one second processor 22 may combine a plurality of output images and generate output data OUT defining a plurality of output patterns.

In some embodiments, the at least one second processor 22 may receive data defining the plurality of pairs of the design pattern sample and the physical pattern sample and generate a plurality of pairs of input images IMG_I and output images IMG_O from the received data. The at least one second processor 22 may communicate with the at least one first processor 21, based on the plurality of pairs of the input images IMG_I and the output images IMG_O, and train the at least one ML model 21_1.

Figure 3A:
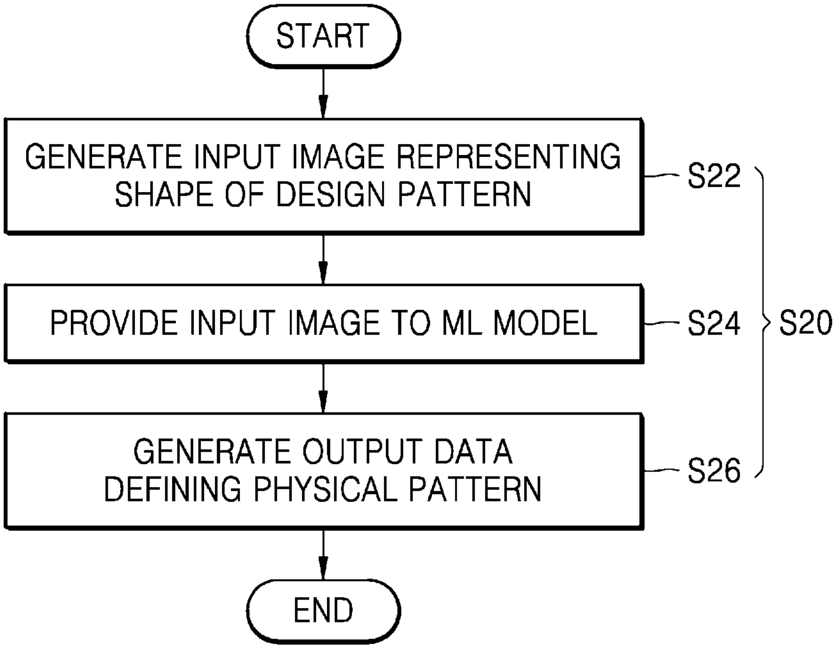
FIGS. 3A and 3B are flowcharts of examples of a method of modeling a semiconductor fabrication process according to example embodiments of the inventive concept.
Figure 3B:
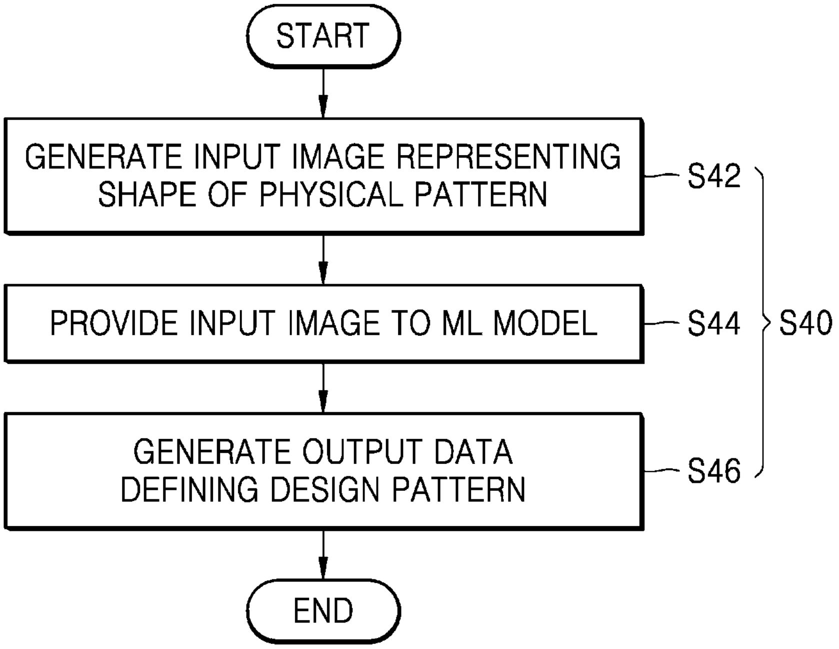

FIGS. 3A and 3B are flowcharts of examples of a method of modeling a semiconductor fabrication process, according to example embodiments of the inventive concept. Specifically, the flowchart of FIG. 3A illustrates a method of estimating a physical pattern from a design pattern, and FIG. 3B illustrates a method of estimating a design pattern from a physical pattern. That is, the input pattern and the output pattern of FIG. 2 may respectively correspond to the design pattern and the physical pattern in operation S20 of FIG. 3A, and respectively correspond to the physical pattern and the design pattern in operation S40 of FIG. 3B. In some embodiments, operation S20 of FIG. 3A and operation S40 of FIG. 3B may be performed by the system 20 of FIG. 2. Hereinafter, FIGS. 3A and 3B will be described with reference to FIGS. 1 and 2.

Referring to FIG. 3A, operation S20 may include a plurality of operations (e.g., S22, S24, and S26). In operation S22, an input image IMG_I representing a shape of the design pattern may be generated. For example, the at least one second processor 22 may receive input data IN geometrically defining the second pattern P12 of FIG. 1 and generate an input image IMG_I representing a shape of the second pattern P12 from the input data IN. The input image IMG_1 may have a format that at least one ML model 21_1 may identify.

In operation S24, the input image IMG_I may be provided to an ML model. For example, the at least one second processor 22 may provide the input image IMG_I to the at least one first processor 21 configured to implement the at least one ML model 21_1. In some embodiments, the input image IMG_I may correspond to a binary image as described below with reference to FIGS. 4A and 4B. For example, the input image IMG_I may be an array including elements, each of which has an index determined based on coordinates of a pixel included in the binary image and has a value of the pixel.

In operation S26, output data OUT defining the physical pattern may be generated. For example, the at least one first processor 21 may provide the output image IMG_O generated by the at least one ML model 21_1 to the at least one second processor 22 in response to the input image IMG_I provided in operation S24. The at least one second processor 22 may identify a shape of the second pattern P12 and/or the fourth pattern P14 of FIG. 1 (e.g., a contour of the second pattern P12 and/or the fourth pattern P14) from the output image IMG_O, and generate output data OUT, which geometrically defines the second pattern P12 and/or the fourth pattern P14, based on the identified contour. In some embodiments, the output data OUT may be used to calibrate a design pattern by a designer or a calibration system. Thus, the design pattern may be calibrated precisely.

Referring to FIG. 3B, operation S40 may include a plurality of operations (e.g., S42, S44, and S46). In operation S42, an input image IMG_I representing a shape of the physical pattern may be generated. For example, the at least one processor 22 may receive input data IN generated by capturing an image of the third pattern P13 and/or the fourth pattern P14 of FIG. 1, and generate an input image IMG_I representing a shape of the third pattern P13 and/or the fourth pattern P14 from the input data IN. The input image IMG_I may have a format that at least one ML model 21_1 may identify.

In operation S44, the input image IMG_I may be provided to an ML model. For example, the at least one second processor 22 may provide the input image IMG_I to the at least one first processor 21 configured to implement the at least one ML model 21_1. In some embodiments, the input image IMG_I may correspond to a binary image as described below with reference to FIGS. 4A and 4B. For example, the input image IMG_I may be an array including elements, each of which has an index determined based on coordinates of a pixel included in the binary image and has a value of the pixel.

In operation S46, output data OUT defining a design pattern may be generated. For example, the at least one first processor 21 may provide an output image IMG_O generated by the at least one ML model 21_1 to the at least one second processor 22 in response to the input image IMG_I provided in operation S44. The at least one second processor 22 may identify a shape of the second pattern P12 of FIG. 1 (e.g., a contour of the second pattern P12) from the output image IMG_O, and generate output data OUT, which geometrically defines the second pattern P12 based on the identified contour. In some embodiments, the output data OUT may be used to design a photomask PM, and thus, the photomask PM may be manufactured precisely.

Figure 4A:
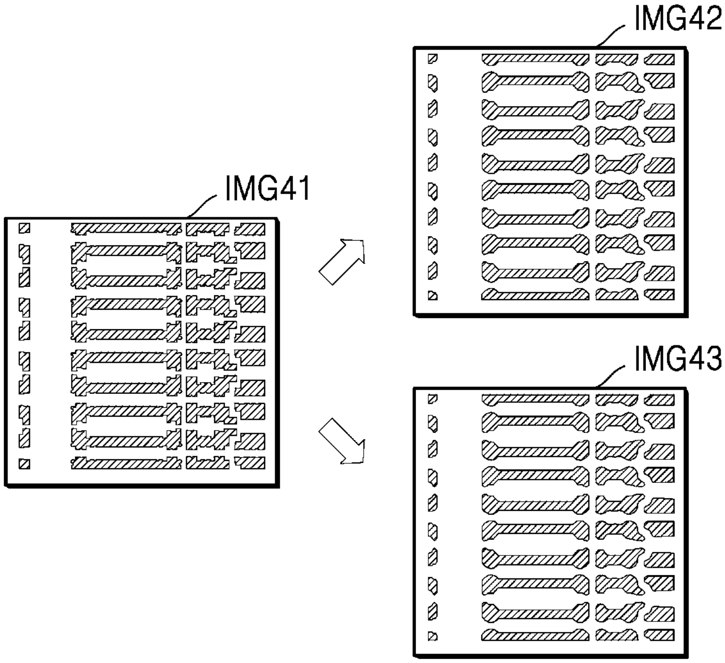
FIGS. 4A and 4B are diagrams of examples of images representing example patterns according to example embodiments of the inventive concept.
Figure 4B:
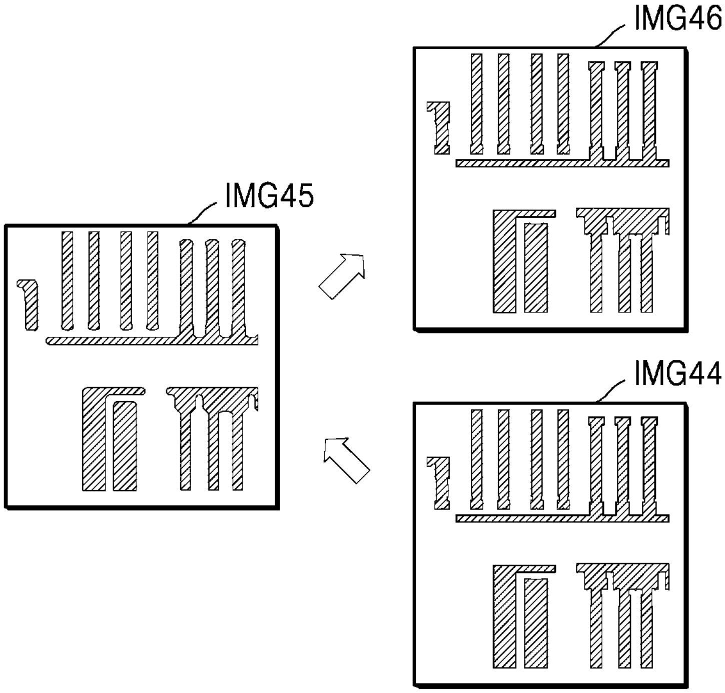

FIGS. 4A and 4B are diagrams of examples of images representing example patterns according to example embodiments of the inventive concept. Specifically, FIG. 4A illustrates examples of an input image and an output image, which are generated in operation S20 of FIG. 3A. and FIG. 4B illustrates examples of an input image and an output image, which are generated in operation S40 of FIG. 3B.

Referring to FIG. 4A, a first image IMG41 may represent a pattern (i.e., a design pattern) formed in a photomask PM. A second image IMG42 may represent a physical pattern formed by a semiconductor process using the photoresist PM in which the design pattern of the first image IMG41 is formed. The second image IMG42 may be formed by capturing an image of a wafer. A third image IMG43 may represent a physical pattern estimated from the design pattern of the first image IMG41 due to operation S20 of FIG. 3A. The third image IMG43 may be generated by the at least one ML model 21_1 of FIG. 2. As shown in FIG. 4A, the second image IMG42 and the third image IMG43 may represent contours that substantially coincide with each other. Thus, it can be confirmed that the at least one ML model 21_1 may precisely model the semiconductor process, and the physical pattern may be precisely estimated due to operation S20 of FIG. 3A.

Referring to FIG. 4B, a fourth image IMG44 may represent a pattern (i.e., a design pattern) formed in a photomask PM. A fifth image IMG45 may represent a physical pattern formed by a semiconductor process using the photomask PM in which the design pattern of the fourth image IMG44 is formed. The fifth image IMG45 may be formed by forming an image of a wafer. A sixth image IMG46 may represent a design pattern estimated from the physical pattern of the fifth image IMG45 due to operation S40 of FIG. 3B. The sixth image IMG45 may be generated by the at least one ML model 21_1 of FIG. 2. As shown in FIG. 4B, the fourth image IMG44 and the sixth image IMG46 may represent contours that substantially coincide with each other. Thus, it can be confirmed that the at least one ML model 21_1 may precisely model the semiconductor process, and the design pattern may be precisely estimated due to operation S40 of FIG. 3B.

Figure 5:
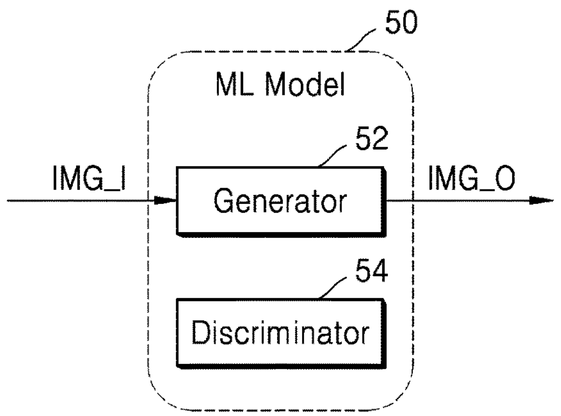
FIG. 5 is a block diagram of an example of a machine learning (ML) model according to an example embodiment of the inventive concept.

FIG. 5 is a block diagram of an example of an ML model 50, according to an example embodiment of the inventive concept. In some embodiments, the ML model 50 of FIG. 5 may be included in at least one ML model 21_1 of FIG. 2. As shown in FIG. 5, the ML model 50 may include a generator 52 and a discriminator 54.

In some embodiments, the ML model 50 may be implemented as a generative adversarial network (GAN) including the generator 52 and the discriminator 54, which are trained by using a plurality of pairs of images of a design pattern sample and a physical pattern sample. The generator 52 and the discriminator 54 may be respectively referred to as a generator network and a discriminator network, and the trained generator 52 may generate an output image IMG_O from an input image IMG_I. The GAN may include a generator network configured to generate a fake image from noise and a discriminator network configured to identify the fake image. For example, the generator network may output the fake image, while the discriminator network may output a probability of an actual image (or probability of the fake image) by evaluating the fake image. The discriminator network may be trained to identify the fake image based on the actual image and the fake image, while the generator network may be trained so that the discriminator network may identify the fake image, which has been generated by the generator network, as the actual image. Thus, the trained generator network may generate a fake image that is very similar to the actual image. Similarly, the generator 52 of FIG. 5 may be trained to generate the output image IMG_O representing an output pattern from the input image IMG_I representing an input pattern. An example of operations for training the generator 52 and the discriminator 54 will be described below with reference to FIG. 6.

Figure 6:
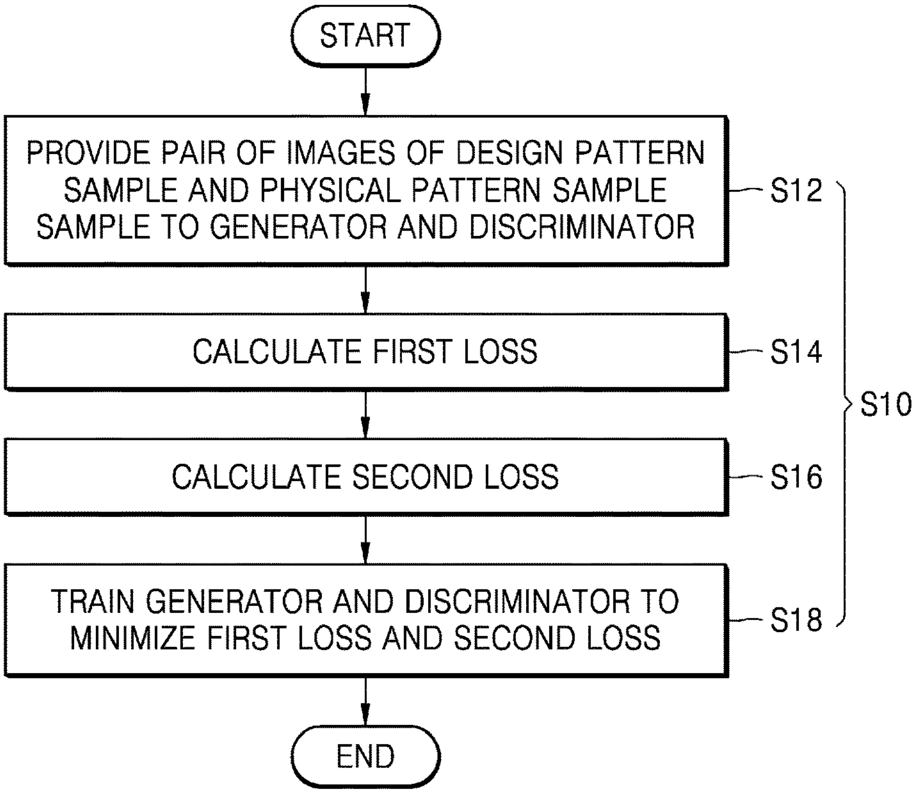
FIG. 6 is a flowchart of an example of a method of modeling a semiconductor fabrication process, according to an example embodiment of the inventive concept.

FIG. 6 is a flowchart of an example of a method of modeling a semiconductor fabrication process according to an example embodiment of the inventive concept. Specifically, the flowchart of FIG. 6 illustrates an example of operations of training an ML model used to model the semiconductor fabrication process. In some embodiments, operation S10 of FIG. 6 may be repeated before operation S20 of FIG. 3A and operation S40 of FIG. 3B are performed. In some embodiments, operation S10 of FIG. 6 may be performed by the at least one second processor 22 of FIG. 2, and the at least one second processor 22 may be used to train the ML model 50 of FIG. 5. As shown in FIG. 6, operation S10 may include a plurality of operations S12, S14, S16, and S18. Hereinafter, FIG. 6 will be described with reference to FIGS. 2 and 5.

Referring to FIG. 6, in operation S12, pairs of images of a design pattern sample and a physical pattern sample may be provided to a generator 52 and a discriminator 54. For example, the at least one second processor 22 may provide the pairs of images of the design pattern sample and the physical pattern sample to the discriminator 54, and the discriminator 54 may generate a first output (e.g., OUT1 in FIGS. 7A and 7B) in response to the pairs of images of the design pattern sample and the physical pattern sample. In addition, the at least one second processor 22 may provide an image of the design pattern sample or an image of the physical pattern sample to the generator 52, and the generator 52 may generate an image of an estimated physical pattern or an image of an estimated design pattern. Furthermore, the at least one second processor 22 may provide an image of the design pattern sample or an image of the physical pattern sample together with an image of a physical pattern generated by the generator 52 or an image of a design pattern generated by the generator 52, and the discriminator 54 may generate a second output (e.g., OUT2 in FIGS. 7A and 7B) in response to the provided images. Examples of operation S12 will be described below with reference to FIGS. 7A and 7B.

In operation S14, a first loss may be calculated. For example, the at least one second processor 22 may calculate the first loss based on an error between the image generated by the generator 52 and an actual image. When the image provided to the generator 52 is x, the image generated by the generator 52 from x is G(x), and the actual image corresponding to x is y, the first loss L1 may be calculated as shown in Equation 1:

$$L1=f(\|y-G(x)\|) \quad \text{[Equation 1]}$$

wherein a function f may be a monotonically increasing function and be, for example, a function that averages errors of each of pixels.

In operation S16, a second loss may be calculated. For example, the at least one second processor 22 may calculate the second loss based on the first output and the second output of the discriminator 54. The discriminator 54 may generate output, which increases as the probability of the fake image increases. When the first output generated by the discriminator 54 from the actual image y corresponding to the image x is D(y) and the second output generated by the discriminator 54 from the image G(x) generated by the generator 52 from the image x is D(G(x)), the second loss L2 may be calculated as shown in Equation 2:

$$L2=g_1(D(y))+g_2(1-D(G(x))) \quad \text{[Equation 2]}$$

wherein functions $g_1$ and $g_2$ may be monotonically increasing and decreasing functions, respectively, and be, for example, log functions. Thus, in Equation 2, $g_1(D(y))$ (which may be herein referred to as a first term) may increase as the first output of the discriminator 54 increases, whereas $g_2(1-D(G(x)))$ (which may be herein referred to as a second term) may decrease as the second output of the discriminator 54 increases. The at least one second processor 22 may calculate the second loss as the sum of $g_1(D(y))$ and $g_2(1-D(G(x)))$.

In operation S18, the generator 52 and the discriminator 54 may be trained to minimize or reduce the first loss and the second loss. For example, the at least one second processor 22 may train the generator 52 and the discriminator 54 to minimize or reduce the sum of the first loss L1 calculated in Equation 1 and the second loss L2 calculated in Equation 2. In some embodiments, when the generator 52 and the discriminator 54 include a neural network, the generator 52 and the discriminator 54 may be trained based on back propagation.

Figure 7A:
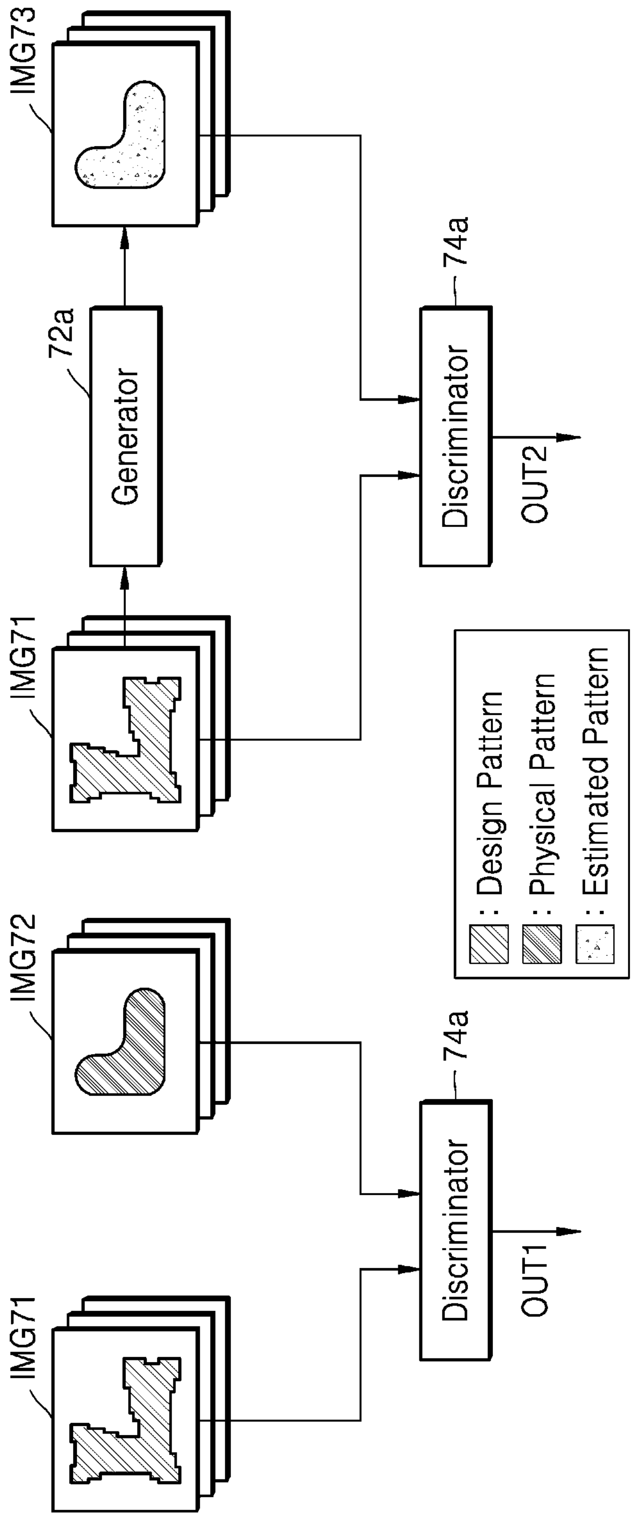
FIGS. 7A and 7B are diagrams that illustrate example operations for training an ML model according to example embodiments of the inventive concept.
Figure 7B:
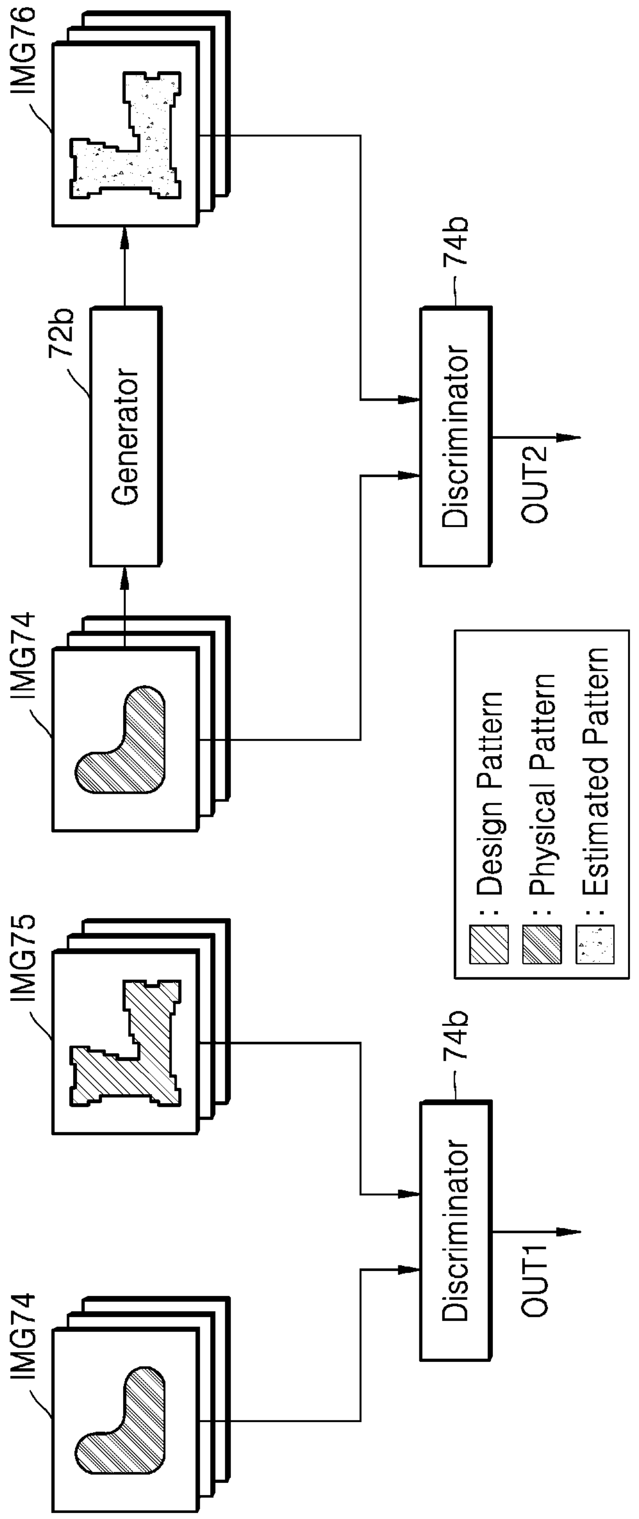

FIGS. 7A and 7B are diagrams that illustrate example operations for training an ML model according to example embodiments of the inventive concept. Specifically, FIG. 7A illustrates example operations of training a generator 72*a* and a discriminator 74*a* to estimate a physical pattern from a design pattern, and FIG. 7B illustrates example operations of training a generator 72*b* and a discriminator 74*b* to estimate a design pattern from a physical pattern. As shown in FIGS. 7A and 7B, a plurality of pairs of images of a design pattern sample and a physical pattern sample may be used for the training operations.

Referring to a left side of FIG. 7A, a pair of a first image IMG71 and a second image IMG72 may be provided to the discriminator 74*a*. The first image IMG71 may represent a design pattern sample, and the second image IMG72 may represent a physical pattern sample formed by the design pattern sample. The discriminator 74*a* may generate a first output OUT1 in response to the first image IMG71 and the second image IMG72. In some embodiments, the discriminator 74*a* may output a probability of a fake image and be trained to reduce the first output OUT1 as described above with reference to FIG. 6.

Referring to a right side of FIG. 7A, the first image IMG71 may be provided to the generator 72*a*, and the generator 72*a* may generate a third image IMG73 in response to the first image IMG71. As described above, the first image IMG71 may represent a design pattern sample, and the third image IMG73 may represent a physical pattern estimated by the generator 72*a* from the design pattern sample of the first image IMG71. In some embodiments, the generator 72*a* may be trained to reduce errors between the second image IMG72 and the third image IMG73.

The first image IMG71 and the third image IMG73 may be provided to the discriminator 74*a*. As described above, the first image IMG71 may represent a design pattern sample, and the third image IMG73 may represent a physical pattern estimated from the design pattern sample. The discriminator 74*a* may generate a second output OUT2 in response to the first image IMG71 and the third image IMG73. In some embodiments, the discriminator 74*a* may output probability of a fake image and be trained to increase the second output OUT2 as described above with reference to FIG. 6.

Referring to a left side of FIG. 7B, a pair of a fourth image IMG74 and a fifth image IMG75 may be provided to the discriminator 74*b*. The fourth image IMG74 may represent a physical pattern sample, and the fifth image IMG75 may represent a design pattern sample used to form the physical pattern sample. The discriminator 74*b* may generate a first output OUT1 in response to the fourth image IMG74 and the fifth image IMG75. In some embodiments, the discriminator 74*b* may output a probability of a fake image and be trained to reduce the first output OUT1 as described above with reference to FIG. 6.

Referring to a right side of FIG. 7B, the fourth image IMG74 may be provided to the generator 72*b*, and the generator 72*b* may generate a sixth image IMG76 in response to the fourth image IMG74. As described above, the fourth image IMG74 may represent a physical pattern sample, and the sixth image IMG76 may represent a design pattern estimated by the generator 72*b* from the physical pattern sample of the fourth image IMG74. In some embodiments, the generator 72*b* may be trained to reduce errors between the fifth image IMG75 and the sixth image IMG76.

The fourth image IMG74 and the sixth image IMG76 may be provided to the discriminator 74*b*. As described above, the fourth image IMG74 may represent a physical pattern sample, and the sixth image IMG76 may represent a design pattern estimated from the physical pattern sample. The discriminator 74*b* may generate a second output OUT2 in response to the fourth image IMG74 and the sixth image IMG76. In some embodiments, the discriminator 74*b* may output a probability of a fake image and be trained to increase the second output OUT2 as described above with reference to FIG. 6.

Figure 8A:
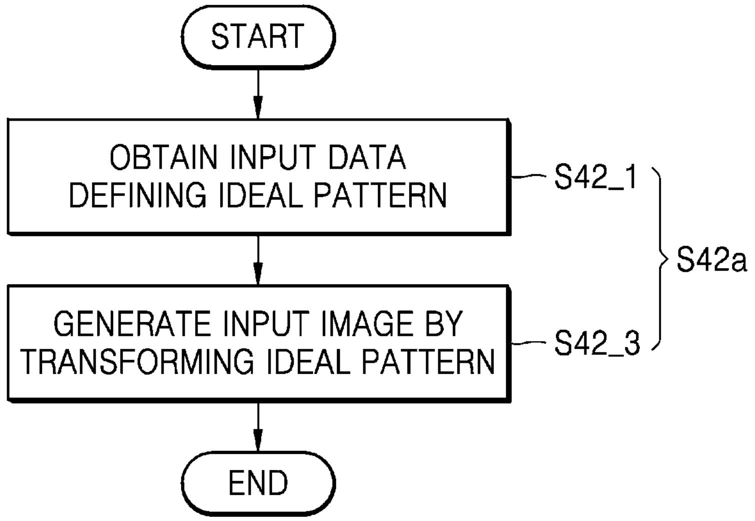
FIGS. 8A and 8B are flowcharts of examples of a method of modeling a semiconductor fabrication process according to further example embodiments of the inventive concept.
Figure 8B:
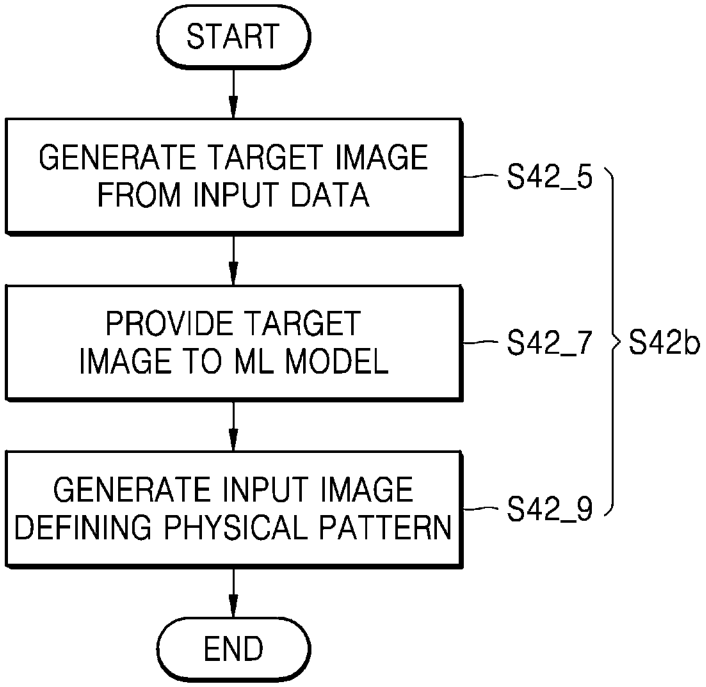

FIGS. 8A and 8B are flowcharts of examples of a method of modeling a semiconductor fabrication process according to further example embodiments of the inventive concept. Specifically, the flowcharts of FIGS. 8A and 8B illustrate examples of operation S42 of FIG. 3B. As described above with reference to FIG. 3B, to estimate a design pattern from a physical pattern, an input image representing a shape of a physical pattern may be generated in operation S42*a* of FIG. 8A and operation S42*b* of FIG. 8B. In some embodiments, operation S42*a* of FIG. 8A and operation S42*b* of FIG. 8B may be performed by the at least one second processor 22 of FIG. 2. Hereinafter, FIGS. 8A and 8B will be described with reference to FIGS. 1 and 2, and a repeat description of the same components as in FIGS. 1 and 2 will be omitted.

Referring to FIG. 8A, operation S42*a* may include operation S42_1 and operation S42_3. In operation S42_1, input data IN defining an ideal pattern may be obtained. For example, the at least one second processor 22 may receive input data IN that geometrically defines the first pattern P11 of FIG. 1. As described above with reference to FIG. 1, the first pattern P11 may have an ideal shape and have a different shape from a physical pattern (e.g., the third pattern P13 and/or the fourth pattern P14). As described above with reference to the drawings, at least one ML model 21_1 may be trained by using a plurality of pairs of images of a design pattern sample and a physical pattern sample. Thus, to estimate the design pattern from the physical pattern, an input image IMG_I representing a shape different from the shape of the first pattern P11 may be provided to the at least one ML model 21_1 instead of providing the ideal shape of the first pattern P11 to the at least one ML model 21_1.

In operation S42_3, the input image IMG_I may be generated by transforming the ideal pattern. For example, the at least one second processor 22 may transform the ideal pattern, based on the predefined rules, and generate the input image IMG_I representing a shape of the transformed pattern. In some embodiments, the predefined rules may include rules that define curvatures of corners of a pattern or rules that define widths based on distances from adjacent patterns. Accordingly, the input image IMG_I representing a shape of a pattern having a relatively actual shape, i.e., a design pattern, may be generated from the ideal pattern.

Referring to FIG. 8B, operation S42*b* may include a plurality of operations (e.g., S42_5, S42_7, and S42_9). In operation S42_5, a target image may be generated from input data IN. For example, the input data IN may geometrically define an ideal pattern, and the at least one second processor 22 may generate a target image representing a shape of the ideal pattern from the input data IN.

In operation S42_7, the target image may be provided to an ML model. For example, the at least one ML model 21_1 may include an ML model, which is trained to output an image representing a physical pattern corresponding to the ideal pattern from an image representing the ideal pattern. The ML model may be trained by using a plurality of pairs of images of an ideal pattern sample and a physical pattern sample, and the at least one second processor 22 may provide the target image generated in operation S42_5 to the ML model. In some embodiments, as described above with reference to FIG. 5, the ML model may be implemented as a generative adversarial network.

In operation S42_9, an input image IMG_I defining the physical pattern may be generated. For example, the at least one second processor 22 may generate the input image IMG_I, based on an image output by the ML model in response to the target image provided in operation S42_7. In some embodiments, the at least one second processor 22 may generate the input image IMG_I, based on the ideal pattern represented by the target image and a pattern represented by the image output by the ML model. For example, the at least one second processor 22 may generate an input image IMG_I representing a contour corresponding to central points between a contour of the ideal pattern and a contour of the pattern represented by the image output by the ML model. In some embodiments, the at least one second processor 22 may generate the image output by the ML model as the input image IMG_I.

Figure 9:
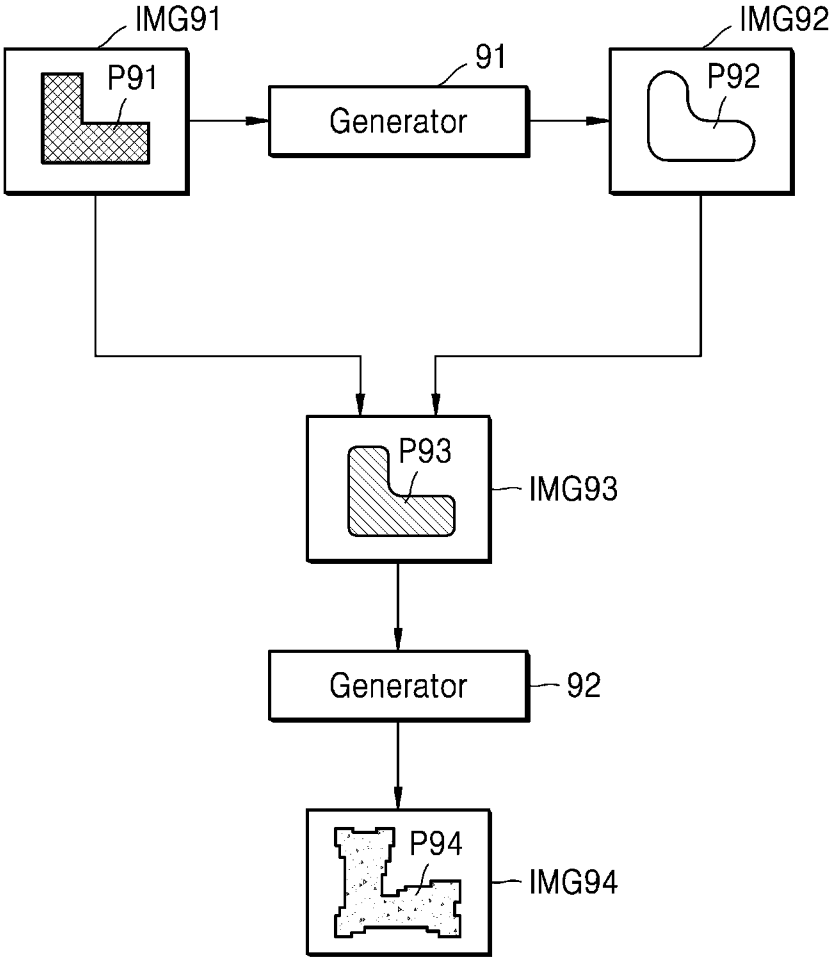
FIG. 9 is a block diagram that illustrates example operations for generating an input image according to an example embodiment of the inventive concept.

FIG. 9 is a block diagram that illustrates example operations for generating an input image according to an example embodiment of the inventive concept. Specifically, FIG. 9 illustrates an example of operations for generating an input image IMG93 based on a target image IMG91 due to operation S42*b* of FIG. 8B, and generating an output image IMG94 from the input image IMG93.

Referring to FIG. 9, the target image IMG91 may represent an ideal pattern P91 and be provided to a first generator 91. As described above with reference to FIG. 8B, the first generator 91 may be trained based on a plurality of pairs of images of an ideal pattern sample and a physical pattern sample. Thus, the first generator 91 may output an image IMG92 representing a physical pattern P92 corresponding to the ideal pattern P91.

An input image IMG93 may be generated based on the target image IMG91 and the image IMG92 output by the first generator 91 and provided to a second generator 92. A physical pattern P93 of the input image IMG93 may be generated based on the ideal pattern P91 and the physical pattern P92 estimated by the first generator 91. For example, the physical pattern P93 of the input image IMG93 may be obtained by calculating the average of the ideal pattern P91 and the physical pattern P92. The second generator 92 may generate an output image IMG94 from the input image IMG93. The second generator 92 may be trained based on a plurality of pairs of images of the physical pattern sample and a design pattern sample. Thus, the second generator 92 may generate an output image IMG94 representing a design pattern P94 corresponding to the physical pattern P93.

Figure 10:
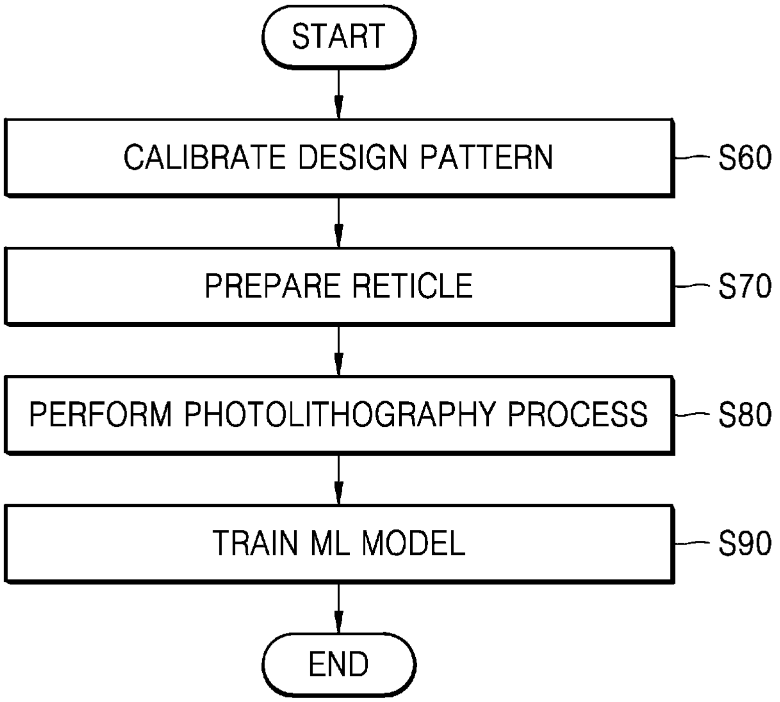
FIG. 10 is a flowchart of a method of modeling a semiconductor fabrication process according to an example embodiment of the inventive concept.

FIG. 10 is a flowchart of a method of modeling a semiconductor fabrication process according to an example embodiment of the inventive concept. Specifically, the flowchart of FIG. 10 illustrates a method of manufacturing an IC by using a design pattern that is calibrated based on a pattern estimated using the example methods described above with reference to the drawings.

Referring to FIG. 10, in operation S60, the design pattern may be calibrated. For example, output data may be generated due to operation S20 of FIG. 3A, and a physical pattern defined in the output data may be estimated. When a physical pattern having an undesirable shape is estimated, the design pattern may be modified, and operation S20 of FIG. 3A may be performed again based on the modified design pattern. In some embodiments, operation S20 of FIG. 3A may be repeated until a physical pattern having a desired shape (e.g., a shape that satisfies predefined rules) is estimated. Thus, the design pattern may be calibrated. In addition, output data may be generated due to operation S40 of FIG. 3B, and a design pattern defined in the output data may be estimated. In some embodiments, when the estimated design pattern is different from an already designed pattern, the already designed pattern may be replaced by the estimated design pattern. In other embodiments, the already designed pattern may be replaced by a newly generated design pattern based on the already designed pattern and the estimated design pattern. Thus, the design pattern may be calibrated.

In operation S70, a reticle may be prepared. For example, a reticle in which the design pattern calibrated in operation S60 is formed may be prepared. Next, a photolithography process may be performed in operation S80. Thus, a physical pattern corresponding to the design pattern may be formed, and an IC including the physical pattern may be manufactured.

In operation S90, an ML model may be trained. For example, an image representing a shape of the designed pattern calibrated in operation S60 and an image formed by capturing an image of the physical pattern formed using the photolithography process in operation S80 may be provided to the ML model, and the ML model may be re-trained based on the provided images. Thus, the ML model may be continuously trained, and the accuracy of subsequently generated estimated patterns may be improved.

Figure 11:
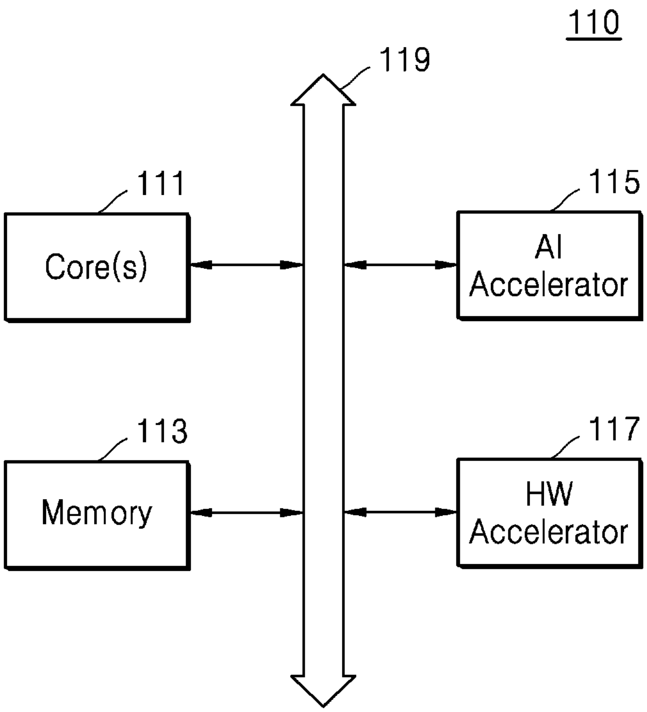
FIG. 11 is a block diagram of a computing system for modeling a semiconductor fabrication process according to an example embodiment of the inventive concept.

FIG. 11 is a block diagram of a computing system 110 for modeling a semiconductor fabrication process according to an example embodiment of the inventive concept. In some embodiments, a method of modeling a semiconductor fabrication process, according to an example embodiment, may be performed by the device 110 of FIG. 11. As shown in FIG. 11, the device 110 may include at least one core 111, a memory 113, an artificial intelligence (AI) accelerator 115, and a hardware (HW) accelerator 117, and the at least one core 111, the memory 113, the AI accelerator 115, and the HW accelerator 117 may communicate with each other through a bus 119. In some embodiments, the at least one core 111, the memory 113, the AI accelerator 115, and the HW accelerator 117 may be included in one semiconductor chip. In some embodiments, at least two of the at least one core 111, the memory 113, the AI accelerator 115, and the HW accelerator 117 may be respectively included in at least two semiconductor chips mounted on a board.

The at least one core 111 may execute instructions. For example, the at least one core 111 may execute an operating system by executing instructions stored in the memory 113, or execute applications on the operating system. In some embodiments, the at least one core 111 may instruct the AI accelerator 115 and/or the HW accelerator 117 to perform operations by executing the instructions, and obtain results of the operations from the AI accelerator 115 and/or the HW accelerator 117. In some embodiments, the at least one core 111 may be an ASIP customized for specific purposes and support a dedicated instruction set.

The memory 113 may have an arbitrary structure configured to store data. For example, the memory 113 may include a volatile memory device, such as dynamic random access memory (DRAM) and static RAM (SRAM), or include a non-volatile memory device, such as flash memory and resistive RAM (RRAM). The at least one core 111, the AI accelerator 115, and the HW accelerator 117 may store data (e.g., IN, IMG_I, IMG_O, and OUT of FIG. 2) in the memory 113 or read data (e.g., IN, IMG_I, IMG_O, and OUT of FIG. 2) from the memory 113 through the bus 119.

The AI accelerator 115 may refer to hardware designed for AI applications. In some embodiments, the AI accelerator 115 may include a neural processing unit (NPU) configured to implement a neuromorphic structure. The AI accelerator 115 may generate output data by processing input data provided from the at least one core 111 and/or the HW accelerator 117, and provide the output data to the at least one core 111 and/or the HW accelerator 117. In some embodiments, the AI accelerator 115 may be programmable and be programmed by the at least one core 111 and/or the HW accelerator 117.

The HW accelerator 117 may refer to hardware designed to perform specific operations at high speed. For example, the HW accelerator 117 may be designed to perform data conversion operations, such as demodulation and modulation operations and encoding and decoding operations, at high speed. The HW accelerator 117 may be programmable and be programmed by at least one core 111 and/or the HW accelerator 117.

The computing system 110 may perform the method of modeling the semiconductor process, according to the example embodiment, and be referred to as a device or computing system for modeling the semiconductor fabrication process. For example, the at least one core 111 and/or the HW accelerator 117 may perform operations performed by the at least one second processor 22 of FIG. 2, and the AI accelerator 115 may perform operations of the at least one first processor 21 of FIG. 2, which executes the at least one ML model 21_1 of FIG. 2. That is, the at least one core 111 and/or the HW accelerator 117 may generate an input image IMG_I and provide the input image IMG_I to the AI accelerator 115, and the AI accelerator 115 may execute at least one ML model, which is trained by using a plurality of pairs of images of a design pattern sample and a physical pattern sample, and provide an output image IMG_O corresponding to the input image IMG_I to the at least one core 111 and/or the HW accelerator 117. In addition, as described with reference to FIG. 10, the ML model executed by the AI accelerator 115 may be trained by using the at least one core 111 and/or the HW accelerator 117.

While the inventive concept has been particularly shown and described with reference to embodiments thereof, it will be understood that various changes in form and details may be made therein without departing from the spirit and scope of the following claims.

What is claimed is:

1. A system for modeling a semiconductor fabrication process, the system comprising:

at least one first processor configured to provide at least one machine learning model comprising a first machine learning model and a second machine learning model, the at least one machine learning model being trained by using a plurality of pairs of images of a design pattern sample and a physical pattern sample, the plurality of pairs of images comprising a first image of a first design pattern sample, the physical pattern sample being formed from the design pattern sample by using the semiconductor fabrication process; and at least one second processor configured to provide an input image representing a shape of a design pattern to a physical pattern to the at least one first processor and to generate output data defining the physical pattern based on an output image received from the at least one first processor, wherein the at least one second processor is configured to train the at least one machine learning model, the training comprising:

calculating a first loss based on an error between the first image of the first design pattern sample and a first output image of the first machine learning model;

calculating a second loss based on a first output and a second output of the second machine learning model, wherein the first output corresponds to the first design pattern sample, and the second output corresponds to the first output image; and training the first machine learning model and the second machine learning model to reduce a sum of the first loss and the second loss.

2. The system of claim 1, wherein the at least one machine learning model comprises a generative adversarial network comprising a generator and a discriminator, which are trained by using the plurality of pairs of images, wherein the generator comprises the first machine learning model, wherein the discriminator comprises the second machine learning model, and wherein the at least one second processor is configured to provide the input image to the generator and to generate the output data based on an output image received from the generator.

3. The system of claim 2, wherein the at least one second processor is configured to train the at least one machine learning model based on a pair of images of a first physical pattern sample and the first design pattern sample, which correspond to each other, by calculating the first loss based on the error between the first image of the first design pattern sample and the first output image of the generator, wherein the first output image of the generator corresponds to the first physical pattern sample, calculating the second loss based on the first output of the discriminator and the second output of the discriminator, wherein the first output of the discriminator corresponds to the first design pattern sample, and the second output of the discriminator corresponds to the first output image, and training the generator and the discriminator to reduce the sum of the first loss and the second loss.

4. The system of claim 3, wherein the at least one second processor is configured to calculate the second loss by calculating a first term that increases as the first output increases, calculating a second term that decreases as the second output increases, and summing the first term and the second term.

5. The system of claim 1, wherein the design pattern and the design pattern sample correspond to a pattern formed in a reticle used for an exposure process included in a photolithography process.

6. The system of claim 5, wherein the physical pattern and the physical pattern sample correspond to a pattern formed after a developing process included in the photolithography process.

7. The system of claim 5, wherein the physical pattern and the physical pattern sample correspond to a pattern formed after an etching process and a cleaning process, which are included in the photolithography process.

8. A method comprising:

generating an input image representing a shape of a physical pattern;

providing the input image to a first machine learning model, the first machine learning model being trained by using a plurality of pairs of images of a physical pattern sample and a design pattern sample, the plurality of pairs of images comprising a first image of a first design pattern sample, the design pattern sample being used to form the physical pattern sample by using a semiconductor fabrication process; and generating output data defining a design pattern based on an output image provided from the first machine learning model, wherein the training of the first machine learning model comprises:

calculating a first loss based on an error between the first image of the first design pattern sample and a first output image of a first network of the first machine learning model;

calculating a second loss based on a first output and a second output of a second network of the first machine learning model, wherein the first output corresponds to the first design pattern sample, and the second output corresponds to the first output image; and training the first network and the second network to reduce a sum of the first loss and the second loss.

9. The method of claim 8, wherein the generating of the input image comprises:

obtaining input data defining an ideal pattern of the physical pattern; and generating the input image from the input data by transforming the ideal pattern.

10. The method of claim 9, wherein the generating of the input image comprises:

generating a target image from the input data defining the ideal pattern of the physical pattern;

providing the target image to a second machine learning model, the second machine learning model being trained by using a plurality of pairs of images of an ideal pattern sample and a physical pattern sample corresponding to the ideal pattern sample; and generating the input image based on the target image and an output image provided from the second machine learning model.

11. The method of claim 8, wherein the first machine learning model comprises a generative adversarial network comprising a generator and a discriminator, which are trained by using the plurality of pairs of images, the generator comprising the first network and the discriminator comprising the second network, wherein the providing of the input image to the first machine learning model comprises providing the input image to the generator, and wherein the generating of the output data comprises generating the output data based on an output image provided from the generator.

12. The method of claim 11, further comprising training the first machine learning model based on a pair of images of a first physical pattern sample and the first design pattern sample, wherein the training of the first machine learning model comprises:

calculating the first loss based on the error between the first image of the first design pattern sample and the first output image of the generator, wherein the first output image of the generator corresponds to the first physical pattern sample;

calculating the second loss based on the first output of the discriminator and the second output of the discriminator, wherein the first output of the discriminator corresponds to the first design pattern sample, and the second output of the discriminator corresponds to the first output image; and training the generator and the discriminator to reduce the sum of the first loss and the second loss.

13. The method of claim 12, wherein the calculating of the second loss comprises:

calculating a first term that increases as the first output increases;

calculating a second term that decreases as the second output increases; and summing the first term and the second term.

14. The method of claim 8, wherein the design pattern and the design pattern sample correspond to a pattern formed in a reticle used for an exposure process included in a photolithography process.

15. The method of claim 14, wherein the physical pattern and the physical pattern sample correspond to a pattern formed after a developing process included in the photolithography process.

16. The method of claim 14, wherein the physical pattern and the physical pattern sample correspond to a pattern formed after an etching process and a cleaning process, which are included in the photolithography process.

17. The method of claim 14, further comprising:

preparing the reticle based on the output data; and performing the photolithography process using the reticle.

18. The method of claim 17, further comprising training the first machine learning model based on a pair of images of the design pattern and the physical pattern, wherein the physical pattern is formed using the photolithography process.

19. A system for modeling a semiconductor fabrication process, the system comprising:

a memory configured to store a program including a series of instructions; and at least one processor, by executing the program, configured to:

generate an input image representing a shape of a physical pattern;

provide the input image to a first machine learning model, the first machine learning model being trained by using a plurality of pairs of images of a physical pattern sample and a design pattern sample, the plurality of pairs of images comprising a first image of a first design pattern sample, the design pattern sample being used to form the physical pattern sample by using a semiconductor fabrication process; and generate output data defining a design pattern based on an output image provided from the first machine learning model, wherein the training of the first machine learning model comprises:

calculating a first loss based on an error between the first image of the first design pattern sample and a first output image of a first network of the first machine learning model;

calculating a second loss based on a first output and a second output of a second network of the first machine learning model, wherein the first output corresponds to the first design pattern sample, and the second output corresponds to the first output image; and training the first network and the second network to reduce a sum of the first loss and the second loss.

20. The system of claim 19, wherein the first machine learning model comprises a generative adversarial network comprising a generator and a discriminator, which are trained by using the plurality of pairs of images, the generator comprises the first network, the discriminator comprises the second network, wherein the at least one processor is further configured to:

provide the input image to the first machine learning model by providing the input image to the generator, and generate the output data by generating the output data based on an output image provided from the generator.

* * * * *